US007950215B2

(12) United States Patent
Chhabra et al.

(10) Patent No.: US 7,950,215 B2
(45) Date of Patent: May 31, 2011

(54) SEQUENTIAL COMBUSTION FIRING SYSTEM FOR A FUEL SYSTEM OF A GAS TURBINE ENGINE

(75) Inventors: Nitin Chhabra, Oviedo, FL (US); Adam Foust, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 809 days.

(21) Appl. No.: 11/942,795

(22) Filed: Nov. 20, 2007

(65) Prior Publication Data
US 2009/0126367 A1 May 21, 2009

(51) Int. Cl.
*F02C 3/00* (2006.01)
(52) U.S. Cl. ......... 60/39.37; 60/776; 60/39.281; 60/739
(58) Field of Classification Search ............... 60/39.281, 60/776, 739, 734, 39.37, 804
See application file for complete search history.

(56) References Cited

U.S. PATENT DOCUMENTS

| | | | |
|---|---|---|---|
| 5,289,685 A | 3/1994 | Hoffa | |
| 5,295,352 A | 3/1994 | Beebe et al. | |
| 5,323,614 A | 6/1994 | Tsukahara et al. | |
| 5,373,692 A * | 12/1994 | Correa | 60/776 |
| 5,491,970 A | 2/1996 | Davis, Jr. et al. | |
| 5,551,228 A | 9/1996 | Mick et al. | |
| 5,660,045 A | 8/1997 | Ito et al. | |
| 5,791,889 A | 8/1998 | Gemmen et al. | |
| 5,806,299 A * | 9/1998 | Bauermeister et al. | 60/776 |
| 5,916,126 A | 6/1999 | Szillat et al. | |
| 6,195,607 B1 * | 2/2001 | Rajamani et al. | 701/100 |
| 6,209,310 B1 * | 4/2001 | Kuenzi et al. | 60/775 |
| 6,670,777 B1 | 12/2003 | Petruska et al. | |
| 6,904,750 B2 | 6/2005 | Venkataramani et al. | |
| 6,968,699 B2 * | 11/2005 | Howell et al. | 60/776 |
| 6,996,991 B2 | 2/2006 | Gadde et al. | |
| 7,000,402 B2 | 2/2006 | Benians | |
| 7,007,455 B2 | 3/2006 | Kraft | |
| 7,051,533 B2 * | 5/2006 | Baino et al. | 60/773 |
| 7,107,773 B2 | 9/2006 | Little | |
| 7,188,465 B2 * | 3/2007 | Kothnur et al. | 60/39.281 |
| 7,269,939 B2 * | 9/2007 | Kothnur et al. | 60/39.281 |
| 7,320,213 B2 * | 1/2008 | Shah et al. | 60/39.281 |
| 7,654,092 B2 * | 2/2010 | Ryan et al. | 60/776 |
| 2001/0027639 A1 | 10/2001 | Emmons | |
| 2002/0112482 A1 | 8/2002 | Johnson et al. | |
| 2004/0025512 A1 | 2/2004 | Davis, Jr. et al. | |
| 2006/0107666 A1 | 5/2006 | Kothnur et al. | |
| 2009/0223228 A1 * | 9/2009 | Romoser | 60/776 |
| 2009/0234555 A1 * | 9/2009 | Williams et al. | 701/100 |
| 2010/0122535 A1 * | 5/2010 | Finkbeiner | 60/734 |

* cited by examiner

*Primary Examiner* — William H Rodríguez

(57) ABSTRACT

A gas turbine combustion system for a turbine engine is disclosed. The gas turbine combustion system may include a plurality of combustor baskets positioned circumferentially about a longitudinal axis of the turbine engine, at least one firing nozzle extending into each of the plurality of combustor baskets and a fuel delivery system in communication with each of the at least one firing nozzles and in communication with at least one fuel source. Each combustor basket may include a fuel flow control device of the fuel delivery system inline with each of the at least one firing nozzles in that combustor basket such that fuel flow to some of the combustor baskets can be shut off while fuel flow to firing nozzles in other combustor baskets remains unobstructed, thereby permitting some combustor baskets to remain non-fired while other combustor baskets are firing to reduce CO emissions.

9 Claims, 2 Drawing Sheets

SEQUENTIAL COMBUSTION FIRING SYSTEM FOR A FUEL SYSTEM OF A GAS TURBINE ENGINE

FIELD OF THE INVENTION

This invention is directed generally to gas turbine engines, and more particularly to the combustion and fuel system for gas turbine engines.

BACKGROUND

Typically, a gas turbine engine includes a plurality of combustor baskets positioned circumferentially about a longitudinal axis of the engine. Each of the combustor baskets typically includes a plurality of nozzles. The nozzles may be separated into different stages and may include pilot nozzles. During operation at full load, all stages of all combustor baskets are typically firing and CO emissions are typically low and within requirements. However, at part loads, a challenge exists to meet current industrial CO emissions requirements while maintaining high efficiency. An improved fuel control system is needed to ensure that the CO emissions requirements are met with relatively high efficiency.

As shown in FIG. 1, gas turbine engines have included fuel control systems formed from a plurality of manifolds for controlling fuel flow to the combustor baskets. For instance, the fuel control system may include a pilot manifold, an A-stage manifold, a B-stage manifold, a C-stage manifold, and a D-stage manifold. Each manifold supplies fuel to all of the nozzles within that particular stage in all of the combustor baskets. The valves positioned inline between the main fuel source and the manifolds control fuel supply to each manifold independently and to all of the nozzles of a particular stage located in the combustor baskets. Closing of a valve reduces fuel flow to all nozzles in that stage in all of the combustor baskets. Thus, all combustor baskets are controlled the same with this system. Thus, this fuel control system can regulate the operation of all combustor baskets between shut-off and 100% full load operation.

SUMMARY OF THE INVENTION

This invention relates to a gas turbine combustion system for a turbine engine. The gas turbine combustion system may control the fuel flow into each of a plurality of combustor baskets such that during partial loads, some of the combustor baskets are firing and the remaining combustor baskets are shut off. As such, engine can operate at part loads by firing less than all of the combustor baskets while maintaining high temperatures in the firing combustor baskets, which creates reduced levels of CO as compared with conventional systems.

The gas turbine combustion system may include a plurality of combustor baskets positioned circumferentially about a longitudinal axis of the turbine engine and at least one firing nozzle extending into each of the plurality of combustor baskets. In one embodiment, each of the combustor baskets comprises a plurality of firing nozzles. A fuel delivery system may be in communication with each of the at least one firing nozzles and in communication with at least one fuel source. The fuel delivery system may include fuel flow control devices for controlling the fuel flow. The fuel flow control devices may be valves or other appropriate devices. In one embodiment, each combustor basket of a portion of the plurality of combustor baskets may include a fuel flow control device of the fuel delivery system inline with each of the at least one firing nozzles in that combustor basket such that fuel flow to some of the combustor baskets can be shut off while fuel flow to firing nozzles in other combustor baskets remains unobstructed, thereby permitting a portion of the combustor baskets to remain off while other combustor baskets are firing. In another embodiment, each combustor basket may include a fuel flow control device of the fuel delivery system inline with all of the at least one firing nozzles in that combustor basket such that fuel flow to some of the combustor baskets can be shut off while fuel flow to firing nozzles in other combustor baskets remains unobstructed, thereby permitting a portion of the combustor baskets to remain off while other combustor baskets are firing. The fuel delivery system may also include a control system capable of controlling the sequential firing of at least a portion of the plurality of combustor baskets.

A method of operating combustor baskets in a gas turbine engine include controlling the gas turbine combustion system described above by opening fuel flow control devices inline with a portion of the combustor baskets and closing fuel flow control devices inline with a remaining portion of the combustor baskets. The combustor baskets that are firing may be positioned in any appropriate configuration relative to the combustor baskets that are shut off. In addition, controlling the gas turbine combustion system may include sequentially opening fuel flow control devices inline with a portion of the combustor baskets and sequentially closing fuel flow control devices inline with a remaining portion of the combustor baskets.

An advantage of this invention is engine turndown may be achieved by firing less combustors for a given part load while maintaining high firing temperatures that result in lower CO emissions.

Another advantage of this invention is that use of the invention increases the useful life of the combustor baskets and downstream transitions and lengthens the intervals between combustor inspections because the entire set of combustor baskets is not firing at once; rather, only a portion of the combustor baskets are firing at once.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
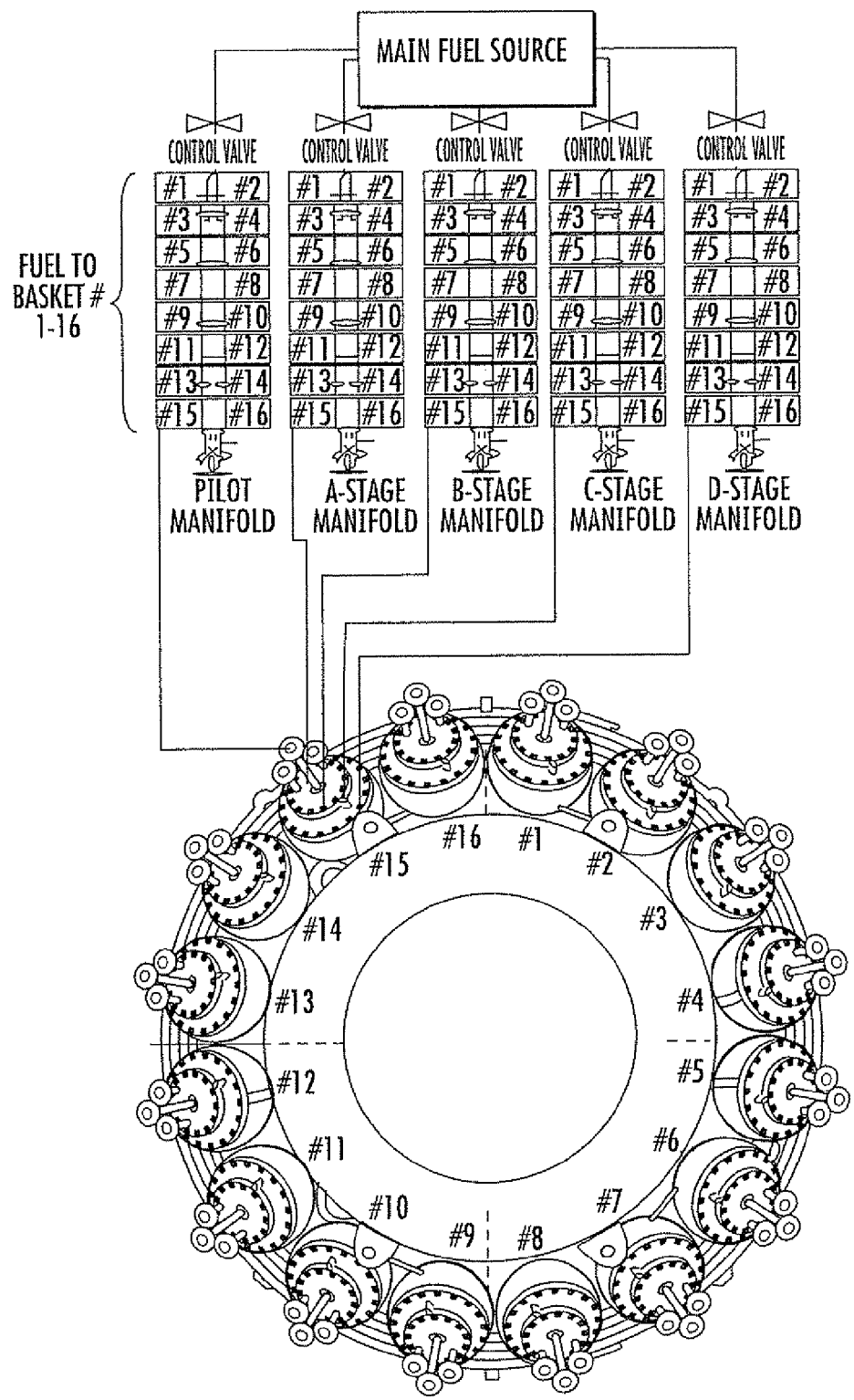
FIG. 1 is a downstream view of a conventional fuel system with valve controls that enable only control of fuel to all combustor baskets simultaneously.
Figure 2:
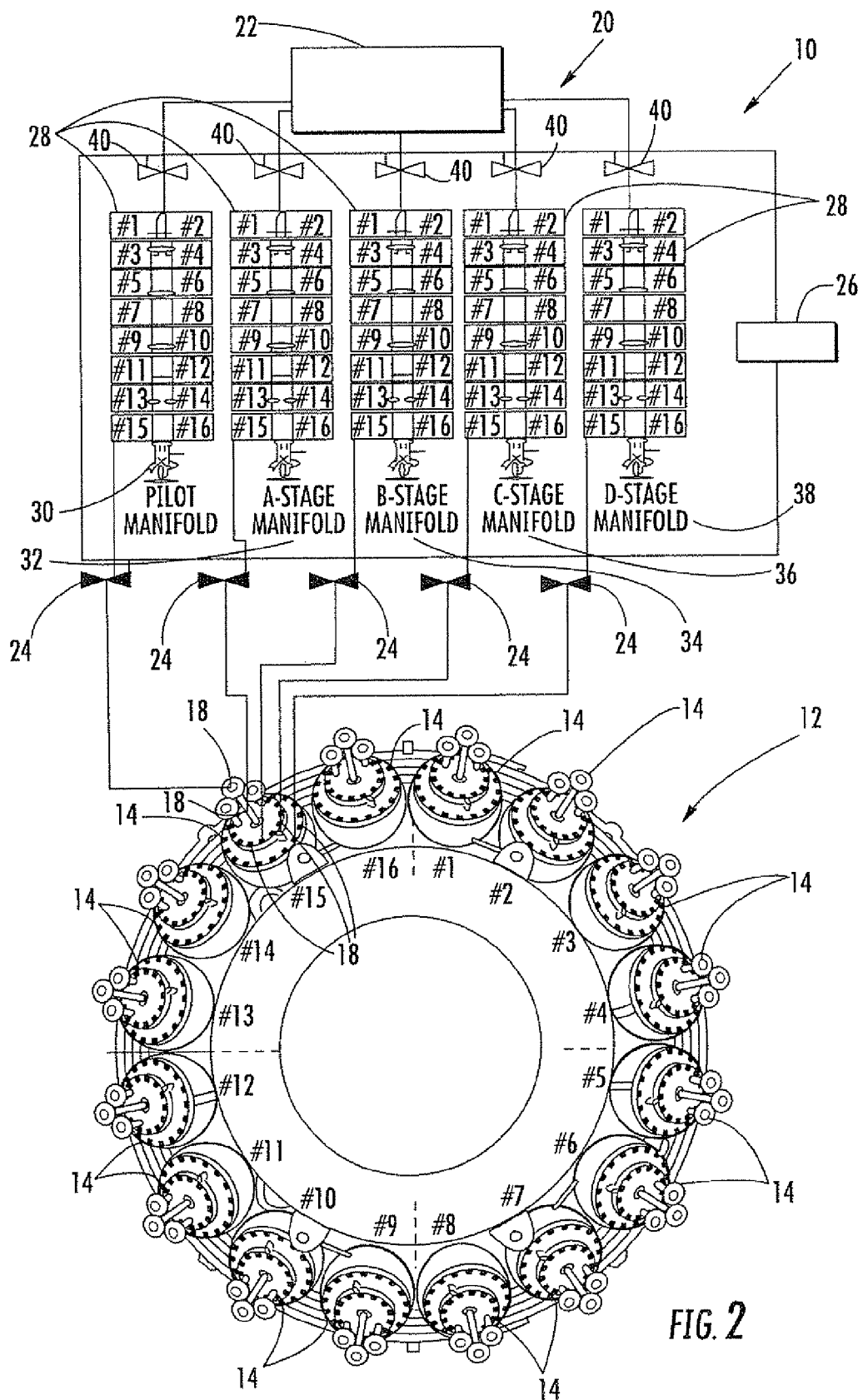
FIG. 2 is a downstream view of the fuel system including aspects of this invention.

As shown in FIG. 2, this invention is directed to a gas turbine combustion system 10 for a turbine engine 12. The gas turbine combustion system 10 may control the fuel flow into each of a plurality of combustor baskets 14 such that during partial loads, some of the combustor baskets 14 are firing and the remaining combustor baskets 14 are shut off. As such, engine turndown is achieved by firing less than all of the combustor baskets 14 while maintaining high temperature in the firing combustor baskets 14, which creates reduced levels of CO as compared with conventional systems.

As shown in FIG. 2, the gas turbine combustion system 10 may be formed from a plurality of combustor baskets 14 positioned circumferentially about a longitudinal axis of the turbine engine 12. The combustor baskets 14 may be canannular combustor baskets 14, or other appropriate combustors, positioned about the longitudinal axis. The combustor baskets 14 may have any appropriate size, configuration and be present in any appropriate number. Each combustor basket 14 may include one or more firing nozzles 18 extending into the combustor basket 14. In one embodiment, the combustor baskets 14 may include a plurality of firing nozzles 18. The firing nozzles 18 may include one or more stages and pilots, and the nozzles 18 may have any appropriate configuration. For instance, as shown in FIG. 2, a single combustor basket 14 may include a pilot nozzle, A-Stage nozzles, B-Stage nozzles, C-Stage nozzles, and D-stage nozzles.

The gas turbine combustion system 10 may also include a fuel delivery system 20 in communication with each of the firing nozzles 18 and in communication with one or more fuel sources 22. The fuel delivery system 20 may include fuel flow control devices 24. The fuel flow control devices 24 may be positioned upstream from the firing nozzles 18 of each combustor basket 14. The fuel flow control devices 24 may be valves, such as solenoid actuated valves, or other appropriate devices. For ease of understanding and viewing, FIG. 2 only depicts fuel flow control devices 24 for one combustor basket 14, which is, for example, no. 15. The remainder of the combustor baskets 14 shown in FIG. 2 may be configured with similar fuel flow control devices 24 of combustor basket no. 15 14.

One or more fuel flow devices 24 may be in fluid communication with each of the firing nozzles 18 within a single combustor basket 14, as shown in FIG. 2, so that all fuel flow to that combustor basket 14 may be shut off without shutting off the fuel flow to the other combustor baskets 14. The fuel flow control devices 24 may be positioned downstream of manifolds 28. The gas turbine combustion system 10 may include manifolds 28 for receiving fuel and dispersing the fuel. Each manifold 28 may receive and disperse fuel for a particular fuel stage. The gas turbine combustion system 10 may include a pilot manifold 30, an A-stage manifold 32, a B-stage manifold 34, a C-stage manifold 36 and a D-stage manifold 38. The gas turbine combustion system 10 may include additional or fewer manifolds 28 in other configurations. The manifolds 38 are configured to each distribute fuel to all fuel nozzles for a particular stage of the turbine engine 12. Valves 40 may be inline between the manifolds 38 and the fuel source 22 to control fuel to the manifolds 38 and to all nozzles downstream of the manifolds 38. For instance, a valve 40 may be used to control fuel flow to the pilot manifold 30 and all pilot nozzles 18 of the turbine engine 12.

In one embodiment of the gas turbine combustion system 10, some, but not all, of the combustor baskets 14 may include one or more fuel flow control devices 24 in communication with all of the firing nozzles 18 in the combustor basket 14. In another embodiment, each combustor basket 14 of the gas turbine combustion system 10 may include one or more fuel flow control devices 24 in communication with all of the firing nozzles 18 in the combustor basket 14. In such a configuration, fuel flow to some of the combustor baskets 14 can be shut off while fuel flow to firing nozzles 18 in other combustor baskets 14 remains unobstructed, thereby permitting a portion of the combustor baskets 14 to remain off while other combustor baskets 14 are firing.

The fuel delivery system 20 may include a control system 26 capable of controlling the sequential firing of at least a portion of the plurality of combustor baskets 14. The control system 26 may be configured to control actuation of the fuel flow control devices. The control system 26 may include any appropriate personal computer, processor, microprocessor, or other appropriate device. The control system 26 may control the fuel flow control devices 24 such that fuel flows to alternating combustor baskets 14, as shown in FIG. 2 in which shaded combustor baskets 14 indicate fueled and firing combustor baskets 14 and non-shaded combustor baskets 14 indicate non-fueled, nonfired combustor baskets 14. The control system 26 may also produce other patterns of fueled/non-fueled combustor baskets 14. For instance, one half of the circle of combustor baskets 14 may be fueled and fired while the remaining half is non-fueled and non-fired. Also, two opposing quarters of the circle of combustor baskets 14 may be fueled and fired while the other set of opposing quarters is non-fueled and non-fired. Other firing schemes may include other patterns of alternating fueled and non-fueled combustor baskets 14. In yet other firing schemes, there may not be a pattern of fueled and non-fueled combustor baskets 14, but a random configuration. The control system 26 may also change which combustor baskets 14 are fired during engine operation. The control system 26 may swap fueled and fired combustor baskets 14 with non-fueled and non-fired combustor baskets 14 and vice versa to evenly distribute the operating time across all combustor baskets 14 of the gas turbine combustion system 10. The control system 26 may also increase or reduce the number of combustor baskets 14 fired while the turbine engine is running.

During operation, the gas turbine combustion system 10 may be operated under full or partial loads. Fuel may be delivered to all of the combustor baskets 14 when the turbine engine 12 is under full load. During partial loading, fuel may be delivered to only a portion of the combustor baskets 14 while the remainder of combustor baskets 14 are shutoff to all fuel flow, thereby enabling some combustor baskets 14 to be fired and some to be shut off. The method of operating the combustor baskets 14 includes controlling a gas turbine combustion system formed from the system previously described above. Controlling the gas turbine combustion system 10 may include opening fuel flow control devices 24 inline with a portion of the combustor baskets 14 and closing fuel flow control devices 24 inline with a remaining portion of the combustor baskets 14. In particular, all of the fuel flow control devices 24 inline with all of the stages of a particular combustor basket 14 can be closed to keep that particular combustor basket 14 non-fired. Controlling the gas turbine combustion system 10 may also include sequentially opening fuel flow control devices 24 inline with a portion of the combustor baskets 14 and sequentially closing fuel flow control devices 24 inline with a remaining portion of the combustor baskets 14.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A gas turbine combustion system for a turbine engine, comprising:
   a plurality of combustor baskets positioned circumferentially about a longitudinal axis of the turbine engine;
   at least one firing nozzle extending into each of the plurality of combustor baskets;
   a fuel delivery system in communication with each of the at least one firing nozzles and in communication with at least one fuel source;
   wherein the fuel delivery system includes shutoff valves;
   wherein each combustor basket of a portion of the plurality of combustor baskets includes at least one shutoff valve of the fuel delivery system inline with each of the at least one firing nozzles in that combustor basket such that fuel flow to that particular combustor basket can be shut off while fuel flow to firing nozzles in other combustor baskets remains unobstructed, thereby permitting a portion of the combustor baskets to remain off while other combustor baskets are firing; and a shutoff valve control system capable of controlling the sequential firing of at least a portion of the plurality of combustor baskets and closing shutoff valves to at least one combustor basket.

2. The gas turbine combustion system of claim 1, wherein each of the combustor baskets comprises a plurality of firing nozzles.

3. The gas turbine combustion system of claim 1, wherein each combustor basket includes a shutoff valve of the fuel delivery system inline with each of the at least one firing nozzles in each combustor basket such that fuel flow to some of the combustor baskets can be shut off while fuel flow to firing nozzles in other combustor baskets remains unobstructed, thereby permitting a portion of the combustor baskets to remain off while other combustor baskets are firing.

4. The gas turbine combustion system of claim 1, wherein the shutoff valves comprise valves inline with a pilot manifold, an A-stage manifold, a B-stage manifold, a C-stage manifold, and a D-stage manifold.

5. A gas turbine combustion system for a turbine engine, comprising:
    a plurality of combustor baskets positioned circumferentially about a longitudinal axis of the turbine engine;
    at least one firing nozzle extending into each of the plurality of combustor baskets;
    a fuel delivery system in communication with each of the at least one firing nozzles and in communication with at least one fuel source;
    wherein the fuel delivery system includes shutoff valves;
    wherein each combustor basket includes a shutoff valve of the fuel delivery system inline with each of the at least one firing nozzles in that combustor basket such that fuel flow to that particular combustor basket can be shut off while fuel flow to firing nozzles in other combustor baskets remains unobstructed, thereby permitting a portion of the combustor baskets to remain off while other combustor baskets are firing.

6. The gas turbine combustion system of claim 5, wherein the fuel delivery system includes a control system capable of controlling the sequential firing of at least a portion of the plurality of combustor baskets.

7. The gas turbine combustion system of claim 5, wherein the shutoff valves comprise valves inline with a pilot manifold, an A-stage manifold, a B-stage manifold, a C-stage manifold, and a D-stage manifold.

8. A method of operating combustor baskets in a gas turbine engine, comprising:
    controlling a gas turbine combustion system formed from a plurality of combustor baskets positioned circumferentially about a longitudinal axis of the turbine engine, at least one firing nozzle extending into each of the plurality of combustor baskets, a fuel delivery system in communication with each of the at least one firing nozzles and in communication with at least one fuel source, wherein the fuel delivery system includes shutoff valves and wherein each combustor basket of a portion of the plurality of combustor baskets includes a shutoff valve of the fuel delivery system inline with each of the at least one firing nozzles in that combustor basket such that fuel flow to some of the combustor baskets can be shut off while fuel flow to firing nozzles in other combustor baskets remains unobstructed, thereby permitting a portion of the combustor baskets to remain off while other combustor baskets are firing, and a control system capable of controlling the sequential firing of at least a portion of the plurality of combustor baskets;
    wherein controlling the gas turbine combustion system comprises opening shutoff valves inline with a portion of the combustor baskets and closing shutoff valves inline with a remaining portion of the combustor baskets.

9. The method of operating combustor baskets in a gas turbine engine of claim 8, wherein controlling the gas turbine combustion system comprises sequentially opening shutoff valves inline with a portion of the combustor baskets and sequentially closing shutoff valves inline with a remaining portion of the combustor baskets.

* * * * *